US011316383B1

(12) United States Patent
Terry (10) Patent No.: US 11,316,383 B1
(45) Date of Patent: Apr. 26, 2022

(54) WIRELESS POWER SYSTEMS WITH FOREIGN OBJECT DETECTION

(71) Applicant: Apple Inc., Cupertino, CA (US)

(72) Inventor: Stephen C. Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/925,207

(22) Filed: Jul. 9, 2020

Related U.S. Application Data (60) Provisional application No. 62/946,044, filed on Dec. 10, 2019.

(51) Int. Cl.
*H02J 50/60* (2016.01)
*H02J 50/70* (2016.01)
*H02J 50/12* (2016.01)

(52) U.S. Cl.
CPC .............. *H02J 50/60* (2016.02); *H02J 50/12* (2016.02); *H02J 50/70* (2016.02)

(58) Field of Classification Search
None
See application file for complete search history.

(56) References Cited

U.S. PATENT DOCUMENTS

| | | | |
|---|---|---|---|
| 9,404,954 B2 | 8/2016 | Roy et al. | |
| 10,348,139 B2 | 7/2019 | Piasecki et al. | |
| 11,175,428 B2 * | 11/2021 | Oshima | ............ G01V 3/10 |
| 2014/0103733 A1 * | 4/2014 | Irie | ............ H02J 50/60 |
| | | | 307/104 |
| 2014/0339907 A1 * | 11/2014 | Omae | ............ G01V 3/101 |
| | | | 307/104 |
| 2015/0022016 A1 * | 1/2015 | Kim | ............ H04B 5/0037 |
| | | | 307/104 |
| 2015/0115728 A1 * | 4/2015 | Yamamoto | ............ H02J 50/40 |
| | | | 307/104 |

(Continued)

OTHER PUBLICATIONS

Vladimir Muratov, Methods for Foreign Object Detection in Inductive Wireless Charging, Qi Delevoper Forum, Nov. 16, 2017, 1-17, MediaTek Inc.

*Primary Examiner* — Rexford N Barnie
*Assistant Examiner* — Terrence R Willoughby
(74) *Attorney, Agent, or Firm* — Treyz Law Group, P.C.; G. Victor Treyz; Joseph F. Guihan

(57) ABSTRACT

A wireless power system has a wireless power transmitting device and a wireless power receiving device. The wireless power transmitting device uses a wireless power transmitting coil to transmit wireless power signals to the wireless power receiving device during wireless power transmission periods. During alternating foreign object detection periods, the wireless power transmitting device gathers signals from the wireless power transmitting coil to detect foreign objects. Another wireless power transmitting device may transmit signals that can cause interference. To help reduce interference, the wireless power transmitting device gathers signals with a sensing coil that is separate from the wireless power transmitting coil and subtracts these signals from signals gathered with the wireless power transmitting coil. A signal quality metric may be used in adjusting the timing of the foreign object detection periods to help avoid interference from the other wireless power transmitting device.

20 Claims, 9 Drawing Sheets

(56) References Cited

U.S. PATENT DOCUMENTS

| | | | | |
|---|---|---|---|---|
| 2015/0318730 A1* | 11/2015 | Bhargava | ................ | H02J 50/40 |
| | | | | 320/108 |
| 2015/0349541 A1* | 12/2015 | Yamamoto | .............. | H02J 50/70 |
| | | | | 307/104 |
| 2015/0349543 A1* | 12/2015 | Sakata | .................... | H02J 5/005 |
| | | | | 307/104 |
| 2016/0096435 A1* | 4/2016 | Lee | ........................ | B60L 53/12 |
| | | | | 307/10.1 |
| 2017/0117755 A1 | 4/2017 | Muratov et al. | | |
| 2017/0117756 A1* | 4/2017 | Muratov | ................. | H02J 7/025 |
| 2017/0179772 A1* | 6/2017 | Asanuma | ............ | H02J 7/00034 |
| 2017/0302112 A1* | 10/2017 | Maniktala | ............... | H02J 50/60 |
| 2018/0219421 A1 | 8/2018 | Yang et al. | | |
| 2019/0386492 A1* | 12/2019 | Fukuzawa | ............... | H02J 7/025 |
| 2020/0076246 A1* | 3/2020 | Fukuzawa | ............... | H02J 50/60 |
| 2020/0091776 A1* | 3/2020 | Kondo | ................... | H02J 50/60 |
| 2020/0153277 A1* | 5/2020 | Mohan | ................... | H02J 50/90 |
| 2021/0083526 A1* | 3/2021 | Bhat | ....................... | H02J 50/10 |
| 2021/0210991 A1* | 7/2021 | He | ........................ | B60L 53/124 |

\* cited by examiner

WIRELESS POWER SYSTEMS WITH FOREIGN OBJECT DETECTION

This application claims the benefit of provisional patent application No. 62/946,044, filed Dec. 10, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power.

SUMMARY

A wireless power system has a wireless power transmitting device and a wireless power receiving device. The wireless power transmitting device may be a wireless charging mat or other device with a charging surface. The wireless power receiving device may be a portable electronic device receiving transmitted wireless power signals from the wireless power transmitting device while resting on the charging surface. During foreign object detection periods, the wireless power receiving device may make signal measurement to detect the presence of foreign objects such as coin or paperclips on the charging surface.

The wireless power transmitting device may transmit power in the vicinity of other wireless power equipment. For example, the wireless power transmitting device may transmit wireless power signals to a first wireless power receiving device while another wireless power transmitting device is transmitting its own wireless power signals to a second wireless power receiving device. The wireless power signals transmitted by the other wireless power transmitting device represent a potential source of wireless interference when attempting to detect foreign objects.

The wireless power transmitting device uses a wireless power transmitting coil to transmit wireless power signals to the wireless power receiving device during wireless power transmission periods. During alternating foreign object detection periods, the wireless power transmitting device gathers signals from wireless power transmitting coil to detect foreign objects. To help reduce interference created when other equipment is transmitting wireless power signals, the wireless power transmitting device gathers signals with a sensing coil that is separate from the wireless power transmitting coil and subtracts these signals from the signals gathered with the wireless power transmitting coil. A signal quality metric may also be used in adjusting the timing of the foreign object detection periods to help avoid interference.

DETAILED DESCRIPTION

A wireless power system includes a wireless power transmitting device such as a wireless charging mat. The wireless power transmitting device wirelessly transmits power to one or more wireless power receiving devices. A wireless power receiving device may be a device such as a wrist watch, cellular telephone, tablet computer, laptop computer, or other electronic equipment. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

If a foreign object such as a paperclip, coin, or other metallic object is present near the wireless power transmitting coil, there may be a risk of eddy current generation in the foreign object that could reduce charging efficiency and/or elevate the temperature of the foreign object. To determine whether a foreign object such as a paperclip or coin is present in the vicinity of the wireless power transmitting device, the wireless power transmitting device can measure the quality factor of the wireless power transmitting coil and can determine whether the quality factor has been affected by the presence of a foreign object. By detecting whether foreign objects are present in this way, suitable action can be taken (e.g., power transfer operations may be halted when a foreign object is detected). To ensure that foreign objects are detected satisfactorily during foreign object detection operations, signal subtraction circuitry and/ or other noise mitigation techniques can be used to help reduce wireless signal interference from nearby wireless power transmitting devices.

Figure 1:
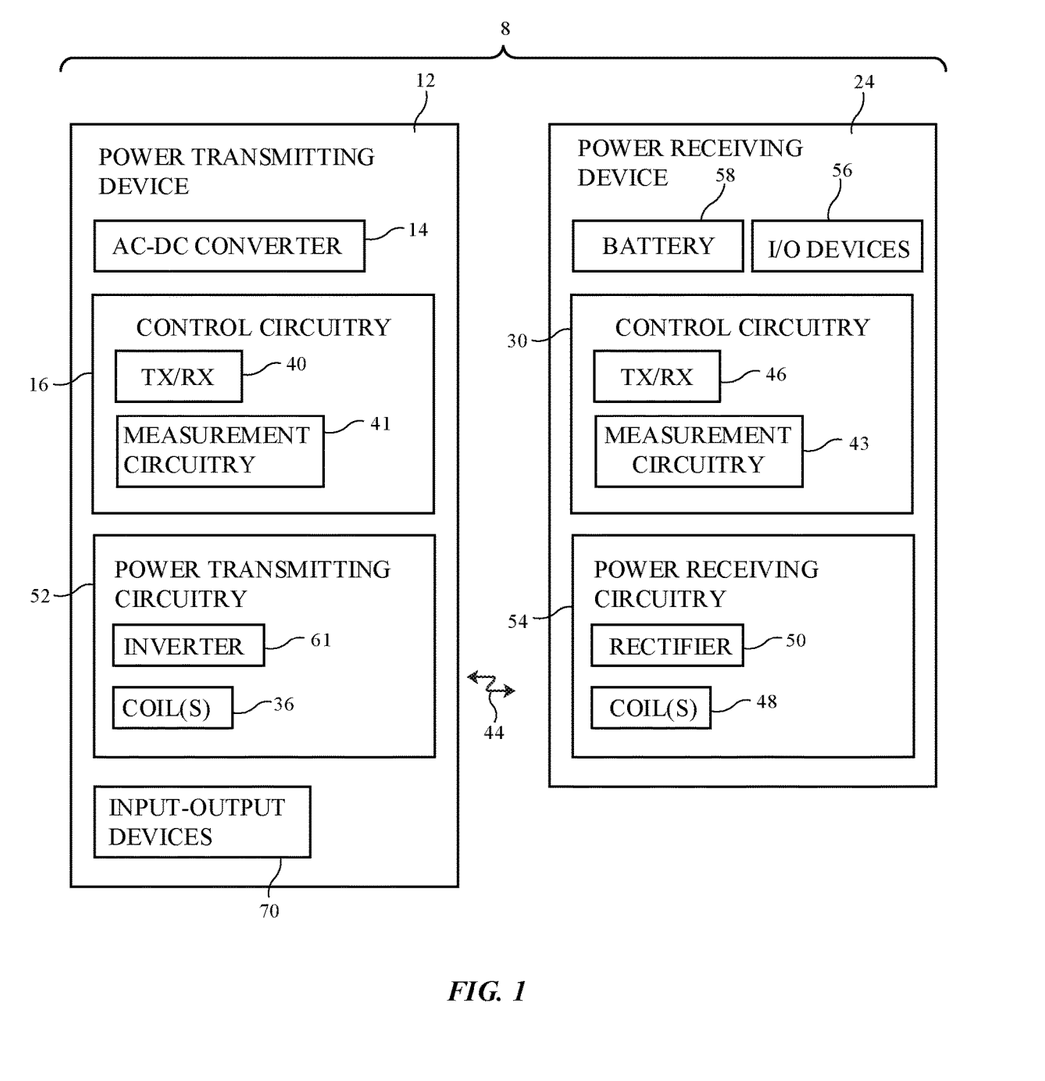
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coils 36 and other circuitry of device 12. The charging surface may be a planer outer surface of the upper housing wall of device 12. Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 and/or on other coils such as optional foreign object detection coils in device 12 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 also includes circuits (e.g., analog-to-digital converter circuits, filters, analog combiners, digital processing circuitry, etc.) to measure the response of system 8.

In an illustrative configuration, device 24 alternates between a wireless power transmission mode in which device 24 transmits wireless power signals and a foreign object detection mode in which device 24 measures the signals in coil(s) 36. System 8 alternates between first periods (sometimes referred to as wireless power transmission periods) in which device 24 operates in the wireless power transmission mode and circuitry 52 transmits wireless power signals through coil(s) 36 and second periods (sometimes referred to as foreign object detection periods) in which device 24 operates in the foreign object detection mode and uses circuitry 41 to measure the signals on coil 36. The signals measured on coils 36 during the foreign object detection periods can be analyzed to extract parameters (Q-factor, resonant frequency, etc.) that are indicative of whether foreign objects are present.

During the foreign object detection periods, the signal on coil(s) 36 exhibits a decaying resonance. The rate of decay (e.g., the decay envelope) can be measured to determine the quality factor Q (Q-factor) of coil(s) 36. By monitoring for changes in Q (e.g., changes from a baseline level that are due to a foreign object) and/or by analyzing other parameters associated with the measured signal in coil(s) 36, device 24 can determine whether a foreign object is present on the charging surface overlapping coil(s) 36 and can take appropriate action (e.g., by halting power transmission).

Figure 2:
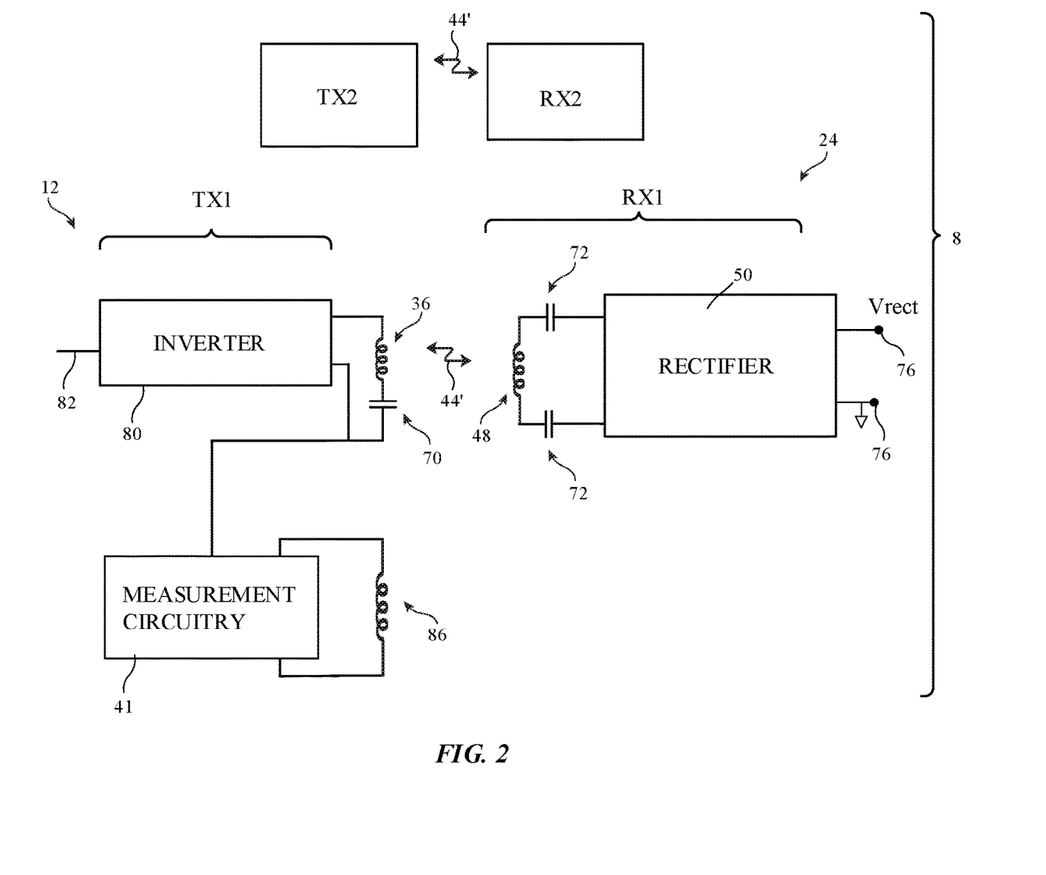
FIG. 2 is a circuit diagram of an illustrative wireless power system with multiple wireless power transmitting devices in accordance with an embodiment.

Illustrative wireless power circuitry of the type that may be used in system 8 is shown in FIG. 2. The wireless power circuitry of FIG. 2 includes wireless power transmitter TX1 and wireless power receiver RX1. During operation, wireless power signals 44 are transmitted by wireless power transmitting circuitry such as transmitter TX1 and received by wireless power receiving circuitry such as receiver RX1. As shown in FIG. 2, transmitter TX1 includes inverter circuitry 80. Control circuitry supplies control signals to control input 82 of inverter circuitry 80. Inverter circuitry 80 supplies corresponding alternating-current drive signals to coil 36. Circuit components such as capacitor 70 may be coupled in series with coil 36 as shown in FIG. 2. When alternating-current current signals are supplied to coil 36, corresponding alternating-current electromagnetic signals (wireless power signals 44) are transmitted to nearby coils such as illustrative coil 48 in receiver RX1. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load.

In some scenarios, more than one wireless power transmitting device may be used in system 8 at the same time. As shown in FIG. 2, for example, a device containing wireless power transmitting circuitry such as transmitter TX2 may operate in the vicinity of devices 12 and 24 (e.g., within 20 cm, within 1 m, or other relatively close proximity of devices 12 and 24). For example, this device may supply wireless power signals 44' to charge a battery in a wireless power receiving device containing wireless power receiving circuitry such as receiver RX2. The presence of transmitter TX2 near to transmitter TX1 can lead to a potential for wireless interference.

As shown in FIG. 2, device 12 may have measurement circuitry 41 for monitoring signals on coil 36. Circuitry 41 may, for example, measure the Q-factor of coil 36 (and, if desired, the frequency of signals in coil 36) during foreign object detection periods. In the presence of wireless power transmitting circuitry TX2, some of transmitted wireless power signals 44' from coil 36 may be received by coil 36 and may create noise. To reduce the impact of this potential source of noise and thereby help ensure that coil signal measurements such as Q-factor measurements are made accurately, device 12 may have a separate sensing coil 86 that is used to measure signals 44'. Circuitry 41 can then use these measurements to remove the contribution of signals 44' to the signals in coil 36 that are measured during the foreign object detection periods.

In addition to or instead of removing noise signals in this way, device 24 can evaluate the quality of the Q-factor measurements that are made during each foreign object detection period and can adjust the timing of the foreign object detection periods to help enhance measurement quality (e.g., foreign object detection period lengths, start times, and/or end times may be adjusted). Particularly in scenarios in which wireless power transmitting circuitry TX2 is periodically pausing wireless power transmission (e.g., so that transmitter TX2 can make its own foreign object detection measurements), there may be quiet periods (periods where signals 44' are not being transmitted) in which noise is reduced. Device 24 can adjust the timing of the foreign object detection periods used by device 24 so as to align the foreign object detection periods with the quiet periods, thereby helping to enhance Q-factor measurement quality.

Figure 3:
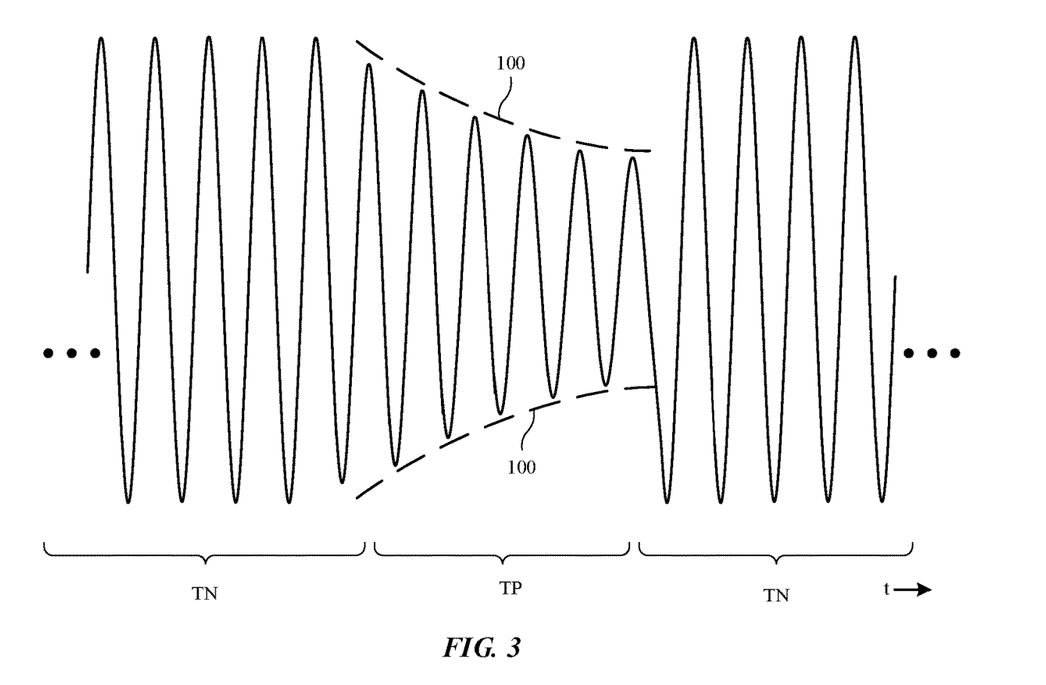
FIG. 3 is a graph showing illustrative wireless signals involved in operating a wireless power system during wireless power transmission periods and foreign object detection periods in accordance with an embodiment.

FIG. 3 is a graph in which an illustrative coil signal in coil 36 has been plotted as a function of time t. During wireless power transmission periods TN, wireless power transmitting circuitry TX1 transmits wireless power signals 44 (e.g., the signal in coil 36 is relatively large and has a steady AC magnitude). Periodically, during foreign object detection periods TP, wireless power transmission by circuitry TX1 is paused and measurement circuitry 41 is used to measure the signals in coil 36. As shown in FIG. 3, because coil 36 is energized from the power applied during preceding period TN, circuitry TX1 resonates during period TP (e.g., there is signal ringing in coil 36). By measuring signal resonating in coil 36 during each period TP, measurement circuitry 41 measures decay envelope 100 and thereby determines the value of Q. This Q-factor value and, if desired, information on the frequency of the coil signal during each period TP can be used to detect foreign objects. For example, the measured value of Q can be compared to a previously obtained baseline Q value. If a change in Q is detected (e.g., a change that is greater in magnitude than a predetermined threshold), device 12 can conclude that a foreign object is present and can take appropriate action (e.g., by halting wireless power transmission).

In the presence of a simultaneously transmitted wireless power signal such as wireless power signal 44' from nearby wireless power transmitting circuitry TX2, there is a potential for signals 44' to be received by coil 36 and create noise during foreign object detection periods TP. This can make it challenging to accurately measure Q and detect foreign objects.

Figure 4:
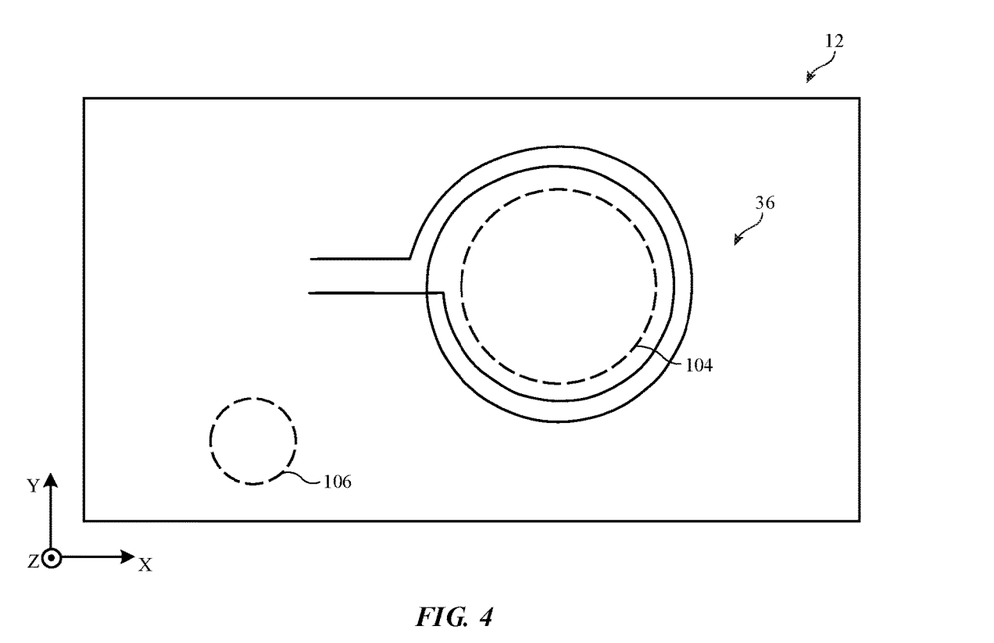
FIG. 4 is a top view of an illustrative wireless power transmitting device with one or more wireless signal sensing coils in accordance with an embodiment.

By measuring signals 44' with a sensing coil, device 12 can subtract signals 44' from the signals being measured on coil 36. FIG. 4 is a top view of device 12 in an illustrative configuration in which device 12 has one or more sensing coils. The sensing coils may be located in areas such as wireless power transmitting coil interior region 104 (e.g., a location within the turns forming coil 36) and/or wireless power transmitting coil exterior region 106 (e.g., an exterior coil region located outside of the turns forming coil 36). The sensing coil and coil(s) 36 may be housed in a housing such as housing 102.

Figure 5:
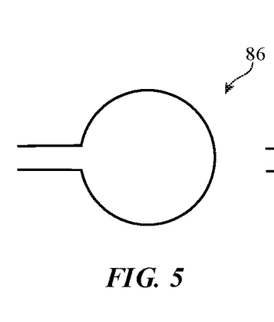
FIGS. 5, 6, and 7 are diagrams of illustrative wireless power sensing coils in accordance with embodiments.
Figure 6:
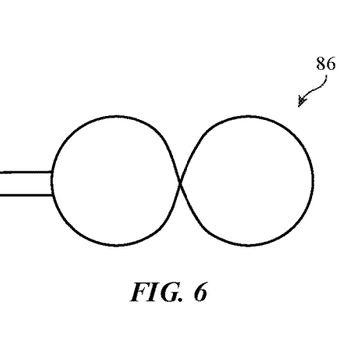
Figure 7:
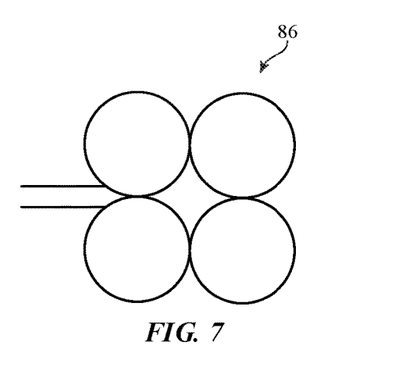

FIGS. 5, 6, and 7 are illustrative sensing coils 86. In the example of FIG. 5, coil 86 is formed from a single loop. Multi-turn loops may also be used in forming sensing coil 86. In the example of FIG. 6, coil 86 is a figure-eight coil. FIG. 7 shows how coil 86 may have a cloverleaf pattern.

In arrangements of the types shown in FIGS. 6 and 7, sensing coil 86 may be configured to exhibit zero output when placed within the interior of coil 36 in region 104 of FIG. 4. Consider, as an example, a scenario in which coil 36 has a figure-eight pattern of the type shown in FIG. 6 and is placed in interior region 104 of coil 36 of device 12 of FIG. 4. In interior region 104, the magnetic field B produced by coil 36 is roughly independent of angular orientation (e.g., all of the magnetic field is oriented in the positive Z direction or all is oriented in the negative Z direction depending on the phase of the AC magnetic field being emitted by coil 36 and all of the magnetic field is rotationally symmetric about the center of coil 36). As a result of the asymmetrical figure-eight pattern of sensing coil 86 of FIG. 6, the first half of the figure-eight of coil 86 will produce a positive voltage (e.g., when the magnetic field B in region 104 is positive) whereas the second half of the figure-eight of coil 86, which has an opposing winding sense, will produce an equal and opposite negative voltage (when the magnetic field B in region 104 is positive). The contributions of the first and second halves of the figure-eight coil will likewise cancel when the magnetic field is negative. The cloverleaf pattern of FIG. 7 is also configured to produce no output from the magnetic field produced by coil 36 when positioned within region 104.

Because sensing coil arrangements such as the arrangements of FIGS. 6 and 7 nominally produce no output as a result of the magnetic field produced by coil 36, this type of sensing coil arrangement can exhibit good sensitivity when measuring magnetic fields from sources such as transmitter TX2 that are off center with respect to coil 36. Unlike circuitry TX1, which produces magnetic fields that are centered on region 104 and induce cancelling voltages in different portions of sensing antenna 86, transmitter TX2 tends to produce magnetic fields that are stronger on one side of coil 86 (the side nearest transmitter TX2) than the other (the side farthest from transmitter TX2). Accordingly, sensing coil arrangements such as the arrangements of FIGS. 6 and 7 may be used to help enhance sensitivity to measurements of noise from circuitry TX2 while decreasing sensitivity to signals from transmitter TX1. If desired, other coil designs can be used (e.g., sensing coil 86 may have one or more turns in a single loop as shown in FIG. 5, etc.).

Figure 8:
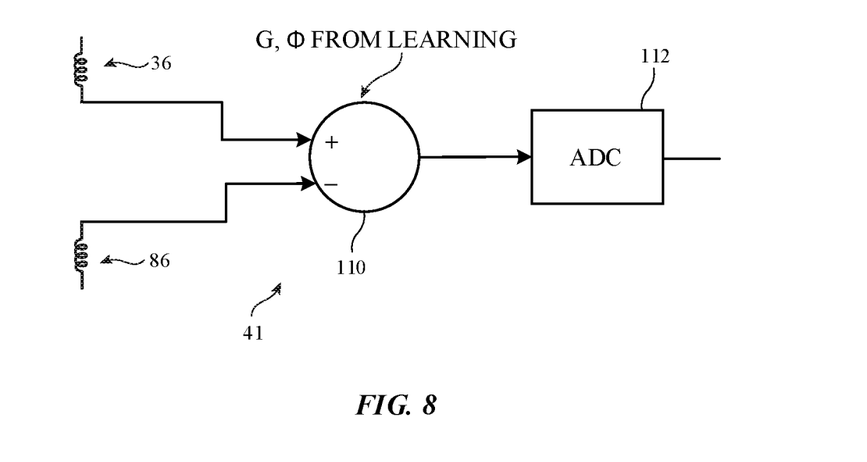
FIG. 8 is a diagram showing how adjacent transmitter noise can be removed from a wireless power transmitting coil signal during foreign object detection operations in accordance with an embodiment.

The signals from circuitry TX2 that are gathered with sensing coil 86 can be removed from the signals in coil 36 using measurement circuitry 41. For example, analog and/or digital signal subtraction circuitry can be used to remove the noise component of the signals in coil 36 (e.g., the TX2 signals measured with coil 86). Illustrative circuitry for removing adjacent transmitter noise from the measured signal in coil 36 during foreign object detection periods is shown in FIG. 8. As shown in FIG. 8, circuitry 41 may include subtractor 110. The gain G (e.g., the relative weight assigned to the positive and negative inputs of subtractor 110) and the relative phase offset $\Phi$ imposed on the positive and negative inputs can be established based on settings obtained during learning operations (e.g. setup operations in which relative coil sensitivity and phase shift measurements are made). After setting up gain G and phase offset $\Phi$, subtractor 100 can subtract signals from circuitry TX2 that are received on sensing coil 86 (e.g., noise signals) from the signal present on coil 36 during foreign object detection periods TP. The resulting output of subtractor 110 may be digitized by analog-to-digital converter 112 and further processed (e.g., to extract decay envelop 100 of FIG. 3 and thereby measure Q, to measure the resonant frequency, or to obtain other parameters during foreign object detection periods TP). By removing interference produced by transmitter TX2 during the foreign object detection periods, the accuracy of the Q measurements (or other measurements) made by circuitry 41 can be enhanced.

Figure 9:
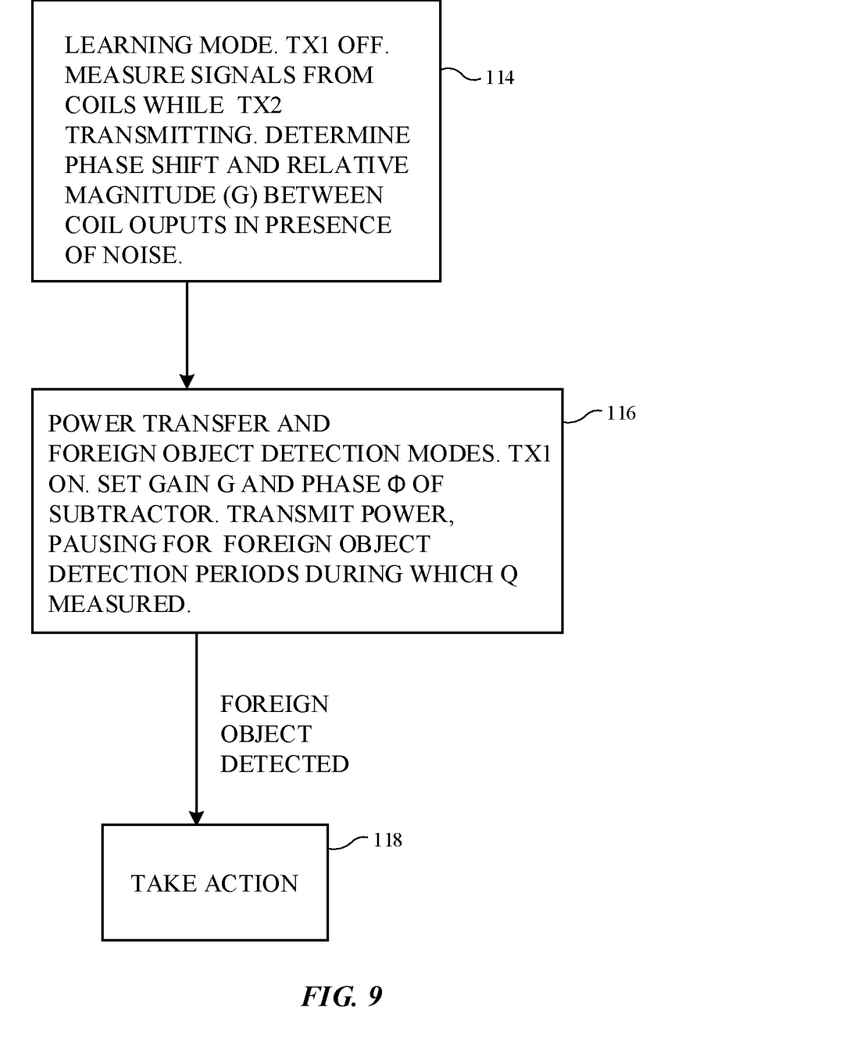
FIG. 9 is a flow chart of illustrative operations involved in using a wireless power transmission system in accordance with an embodiment.

FIG. 9 is a flow chart of illustrative operations involved in using system 8 in a configuration in which noise signals are subtracted from the measurements made on coil 36 during foreign object detection.

During the operations of block 114, system 8 is operated in a learning mode. During this mode, device 12 temporarily turns off wireless power transmitting circuitry in device 12 (e.g., transmitter TX1 is turned off), so that the signals from transmitter TX2 can be measured in isolation. While transmitter TX1 is off, device 12 (e.g., control circuitry such as measurement circuitry 41) measures the signals from transmitter TX2 that are being received by sensing coil 86 and the signals from transmitter TX2 that are being received by coil 36. The relative strength (magnitude) of these signals and the relative phase between these signals can then be determined. For example, device 12 may determine that the received TX2 signal on coil 36 is twice as strong as the received signal on coil 86 and that there is a 10° phase shift between these signals. Based on these measured attributes, device 12 can then establish corresponding compensating settings for gain G (e.g., a gain setting of 2 to compensate for the factor of two difference between the sensitivities of coils 86 and 36) and phase offset $\Phi$ (e.g., a phase offset of 10°). The phase offset and gain settings can be applied to subtractor 110.

During the operations of block 116, device 12 alternates between wireless power transmission periods TN in which wireless power is transmitted by the wireless power transmitting circuitry of device 12 (transmitter TX1) and foreign object detection periods TP in which wireless power delivery by transmitter TX1 is paused. During the foreign object detection periods, circuitry 41 measures the signals detected by coils 36 and 86. Subtractor 110 uses the established gain setting G and phase offset setting $\Phi$ to subtract interference (noise) due to signals 44' from transmitter TX2 from the measured signal on coil 36. The signal on coil 36 can therefore be accurately measured to determine decay envelope 100 (and optionally the frequency of signal resonance) and Q-factor for coil 36. The measured value of Q-factor may be compared to a baseline value (e.g., a running average, default value, a value determined during initial setup operation, and/or other baseline Q-factor value). If the magnitude of the deviation between the measured value of Q and the baseline value of Q is below a threshold amount, device 12 can conclude that no foreign object is present and power delivery can resume during a subsequent wireless power transmission period TN. If, however, Q deviates from the baseline by more than the threshold amount, device 12 can conclude that a foreign object is present and suitable action can be taken. For example, wireless power transmission may be halted at block 118.

Figure 10:
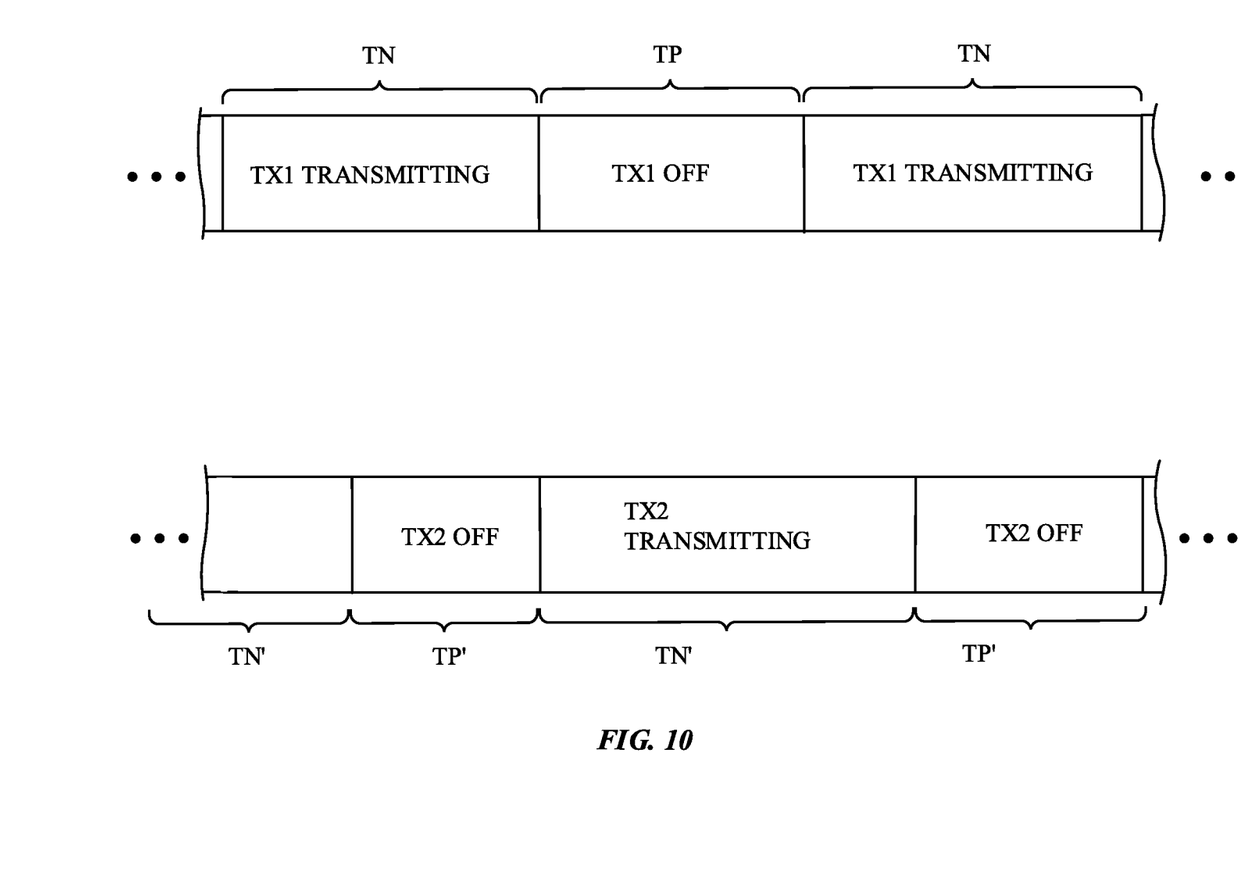
FIG. 10 is a timing diagram for a pair of adjacent wireless power transmitting devices in accordance with an embodiment.

In some scenarios, the wireless power transmitting device that includes transmitter TX2 implements a foreign object detection scheme in which wireless power transmissions are periodically paused (e.g., so that foreign objects can be detected by measuring the Q-factor of the wireless power transmitting coil in transmitter TX2). Wireless power pause periods associated with transmitter TX2 may be misaligned with respect to the foreign object detection periods TP of transmitter TX1. As shown in FIG. 10, for example, device 12 may use transmitter TX1 to transmit power in periods TN and may pause wireless power transmission during foreign object detection periods TP. Another wireless power transmitting device may use transmitter TX2 to alternate between a) wireless power transmission periods TN' in which transmitter TX2 transmits wireless power signals 44' that may interfere with the foreign object detection measurements made by device 12 during periods TP and b) foreign object detection periods (sometimes referred to as power pause periods) TP' in which signals 44' are not present and do not interfere with the foreign object detection measurements made by device 12.

To help enhance measurement accuracy by device 12 during foreign object detection periods TP, device 12 can evaluate the quality of the foreign object detection measurements being made by device 12. Device 12 can then adjust the timing of periods TP (e.g., start and end times for each period TP) so that these periods tend to coincide with low-noise time periods such as periods TP'.

Figure 11:
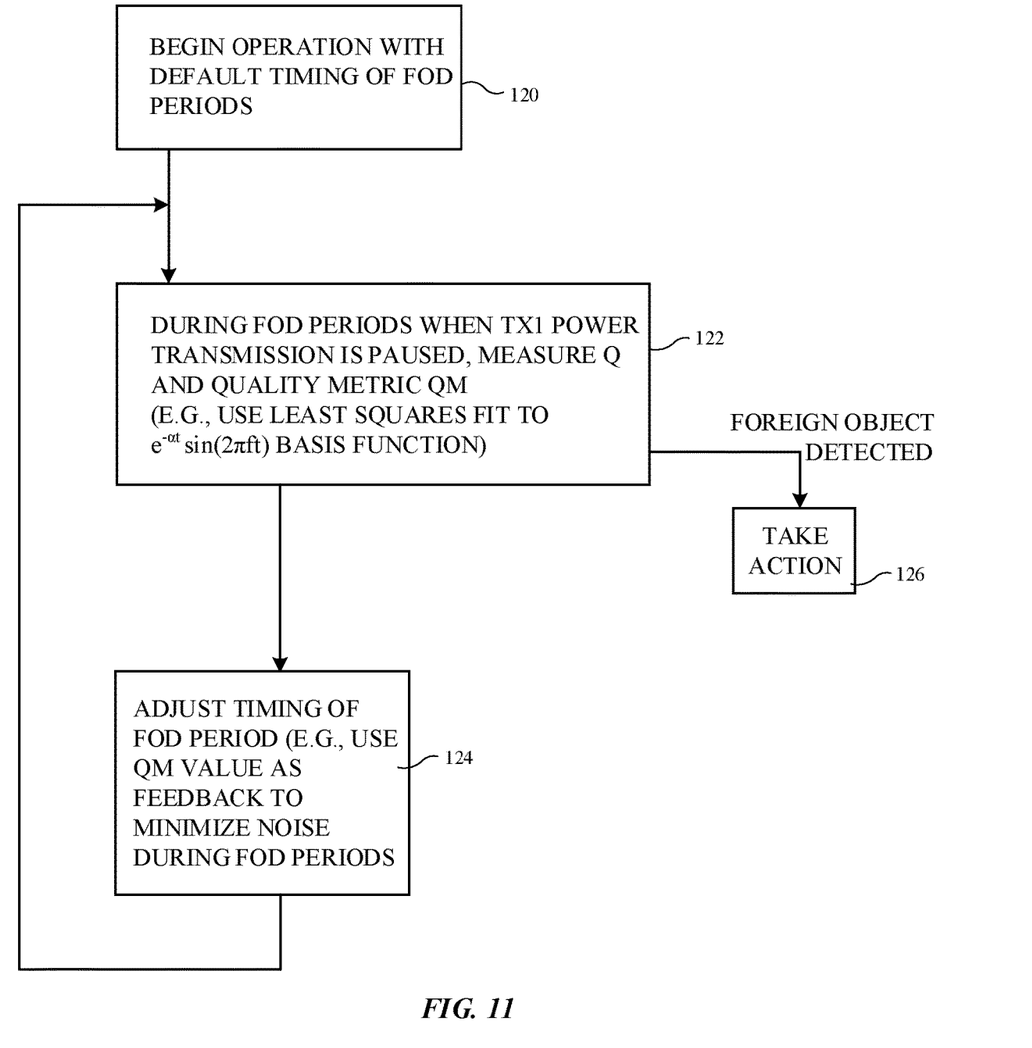
FIG. 11 is a flow chart of illustrative operations involved in using a wireless power transmission system that evaluates signal quality during foreign object detection periods in accordance with an embodiment.

A flow chart of illustrative operations involved in using system 8 in a configuration in which device 12 evaluates the quality of foreign object detection measurements so that the timing of foreign object detection measurements can be adjusted to enhance measurement quality is shown in FIG. 11.

During the operations of block 11, the control circuitry of device 12 operates device 12 with default settings. For example, device 12 may initially be configured so that periods TP of about 100 microseconds (e.g., at least 10 microseconds, at least 50 microseconds, less than 1000 microseconds, less than 500 microseconds, etc.) alternate with periods TN of at least 10 ms, at least 100 ms, at least 1 s, at least 10 s, less than 20 s, less than 2 s, less than 200 ms, less than 20 ms, or less than 2 s (as examples).

During the operations of block 122, device 12 makes foreign object detection measurements (e.g., Q-factor measurements and comparisons) in periods TP. Device 12 also determines the quality of these measurements. For example, because the expected signal during periods TP follows the function $e^{-\alpha t}(\sin(2\pi f t))$, this function can be used as a basis function in a least-squares curve fitting process. If the fit between the basis function and the measured signal on coil 36 during period TP is poor, signal quality metric QM will be relatively low, indicating that the quality of the signal on coil 36 is low because noise is present. If, however, the fit between the basis function and the measured signal on coil 36 during period TP is good, quality metric QM will be relatively high, indicating that the quality of the signal on coil 36 is high due to the absence of interference. Quality metric QM may be determined in this way whether or not sensing coil 86 is present and is being used to measure noise for subtraction from the signal on coil 36.

If the measured Q factor from step 122 deviates by more than a threshold amount from the baseline Q factor, a foreign object is likely present and appropriate action can be taken by device 12 at block 126 (e.g., power transmission can be halted). Otherwise operations may continue at block 124.

Figure 12:
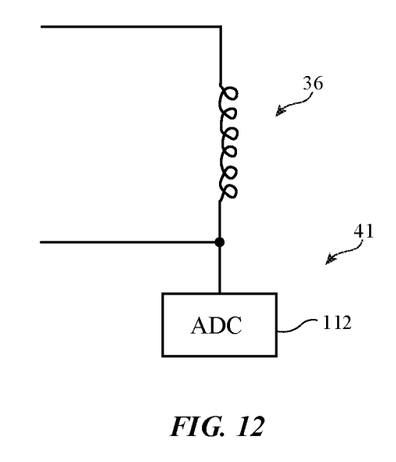
FIG. 12 is a diagram of an illustrative circuit for measuring wireless signals during operation of a wireless power system in accordance with an embodiment.

Because the quality measurement QM indicates whether noise is present or is not present, the value of QM may be used by device 12 to search for a satisfactory timing relationship between periods TP and periods TP' that helps to reduce interference. As an example, during the operations of block 124, device 12 can slightly increment the start time for periods TP. Device 12 can then evaluate QM and can compare the present value of QM to the previous value of QM. If QM decreases, device 12 can decrement the start time. If it is determined, however, that QM has increased due to the increase in the start time, device 12 can further increase the start time for periods TP in an attempt to further increase QM. By adjusting the timing of periods TP back and forth in this way (e.g., by using the measured value of QM as feedback when making dynamic adjustments to the timing of the foreign object detection periods TP), device 12 can ensure that the foreign object detection operations of block 122 are performed when noise from interference (e.g., signals 44' from circuitry TX2) is relatively low. This approach can be used when device 12 has one or more sensing coils 86 and subtracts sensed interference from the signal in coil(s) 36 and/or can be used when device 12 does not have any sensing coils 86 and only has one or more wireless power transmission coils 36 (see, e.g., FIG. 12, which shows how measurement circuitry 41 may include analog-to-digital converter circuitry 112 that measures the signal in coil 36 without subtracting the signal in sensing coil 86 using subtractor 110 of FIG. 8).

The foregoing is merely illustrative and various modifications can be made to the described embodiments. The foregoing embodiments may be implemented individually or in any combination.

What is claimed is:

1. A wireless power transmitting device for transmitting wireless power to a wireless power receiving device in the presence of an additional wireless power transmitting device, comprising:
   wireless power transmitting circuitry having a wireless power transmitting coil configured to transmit wireless power signals to the wireless power receiving device;
   a sensing coil; and
   control circuitry configured to detect foreign objects using the wireless power transmitting coil while using the sensing coil to reduce interference from the additional wireless power transmitting device.

2. The wireless power transmitting device of claim 1 wherein the wireless power transmitting coil has an interior region and wherein the sensing coil is located in the interior region.

3. The wireless power transmitting device of claim 1 wherein the wireless power transmitting coil has an interior region and an exterior region and wherein the wireless power transmitting coil is located in the exterior region.

4. The wireless power transmitting device of claim 1 wherein the control circuitry comprises a subtractor and wherein the control circuitry is configured to subtract interference received from the additional wireless power transmitting device using the sensing coil from a signal received from the wireless power transmitting coil during foreign object detection operations.

5. The wireless power transmitting device of claim 1 wherein the control circuitry is configured to measure a quality factor of the wireless power transmitting coil to detect foreign objects.

6. The wireless power transmitting device of claim 5 wherein the wireless power transmitting circuitry is configured to transmit the wireless power signals during wireless power transmission periods that alternate with foreign object detection periods.

7. The wireless power transmitting device of claim 6 wherein the control circuitry is configured to measure the quality factor of the wireless power transmitting coil during the foreign object detection periods.

8. The wireless power transmitting device of claim 6 wherein the control circuitry is configured to compare signals gathered during the foreign object detection periods using the wireless power transmitting coil to a basis function to produce a signal quality metric.

9. The wireless power transmitting device of claim 8 wherein the control circuitry is configured to adjust relative timing between the foreign object detection periods and the wireless power transmission periods based on the signal quality metric to reduce interference between wireless power signals from the additional wireless power transmitting device and the measurements of the quality factor during the foreign object detection periods.

10. An electronic device, comprising:
   a housing;
   wireless power transmitting circuitry in the housing, wherein the wireless power transmitting circuitry has a wireless power transmitting coil configured to transmit wireless power signals to a wireless power receiving device during wireless power transmission periods;
   measurement circuitry configured to detect foreign objects using the wireless power transmitting coil during foreign object detection periods that alternate with the wireless power transmission periods; and
   control circuitry that is configured to:
      analyze signals gathered by the measurement circuitry from the wireless power transmitting coil during the foreign object detection periods to produce a signal quality metric; and
      adjust timing for the foreign object detection periods to reduce interference from an external wireless power transmitting device with the detection of the foreign objects during the foreign object detection periods.

11. The electronic device of claim 10 further comprising a sensing coil separate from the wireless power transmitting coil, wherein the measurement circuitry measures signals in the sensing coil and uses the measured signals from the sensing coil to reduce the interference.

12. The electronic device of claim 11 wherein the measurement circuitry includes a subtractor configured to subtract the measured signals from the sensing coil from the signals gathered from the wireless power transmitting coil.

13. The electronic device of claim 12 wherein the control circuitry is configured to analyze signals from the wireless power transmitting coil and the sensing coil to determine relative gain and phase offset between the wireless power transmitting coil and the sensing coil.

14. The electronic device of claim 13 wherein the subtractor is configured to use the relative gain and the phase offset in subtracting the measured signals.

15. The electronic device of claim 11 wherein the sensing coil comprises a sensing coil selected from the group consisting of: a figure-eight sensing coil and a cloverleaf sensing coil.

16. The electronic device of claim 10 wherein the control circuitry is further configured to adjust the timing for the foreign object detection periods to place the foreign object detection periods within power pause periods in which the external wireless power transmitting device is pausing wireless power transmission to detect foreign objects.

17. A wireless power transmitting device for transmitting wireless power to a wireless power receiving device, comprising:
a housing;
wireless power transmitting circuitry in the housing, wherein the wireless power transmitting circuitry has a wireless power transmitting coil configured to transmit wireless power signals to the wireless power receiving device and wherein the wireless power transmitting coil has turns surrounding an interior region;
a sensing coil in the housing, wherein the sensing coil is located within the interior region of the wireless power transmitting coil; and
circuitry configured to detect foreign objects based on first signals from the wireless power transmitting coil and second signals from the sensing coil.

18. The wireless power transmitting device of claim 17, wherein the wireless power transmitting circuitry is configured to transmit the wireless power signals in the presence of an additional wireless power transmitting device and wherein the circuitry is configured to subtract the second signals gathered by the sensing coil from the first signals gathered by the wireless power transmitting coil to reduce interference from the additional wireless power transmitting device.

19. The wireless power transmitting device of claim 18 wherein the sensing coil comprises a sensing coil selected from the group consisting of: a figure-eight coil and a cloverleaf coil.

20. The wireless power transmitting device of claim 17 wherein the wireless power transmitting circuitry is configured to transmit the wireless power signals during wireless power transmission periods and wherein the circuitry is configured to use the wireless power transmitting coil and sensing coil to detect the foreign objects during foreign object detection periods that alternate with the wireless power transmission periods.

* * * * *